Patented Mar. 2, 1954

2,671,079

UNITED STATES PATENT OFFICE 2,671,079

PHOSPHORUS-CONTAINING POLYMERS

William B. McCormack, Wilmington, Del., assignor to E. I. du Pont de Nemours and Company, Wilmington, Del., a corporation of Delaware No Drawing. Application August 7, 1951, Serial No. 240,813

14 Claims. (Cl. 260—92.3)

This invention relates to new phosphorus-containing interpolymers and to a process for obtaining them.

In my copending application Serial No. 240,814, there are described stable, heat-resistant polymers containing phosphorus in the form of phosphine oxide groups. These polymers are prepared by the reaction of a hydroxyl-containing compound, such as water or an alcohol, with a phosphorus-containing interpolymer in which the phosphorus is present as dihalotertiaryphosphine groups. The latter interpolymers are the subject of the present application.

It is an object of this invention to provide polymeric products containing phosphorus, which polymers may readily be converted to useful polymers containing phosphorus in the form of the stable phosphine oxide grouping. A further object is to provide a process for the preparation of these intermediate phosphorus-containing polymers.

According to the present invention, such interpolymers are prepared by contacting a polymerizable organic compound containing conjugated olefinic double bonds with a mono-substituted dihalophosphine, in the presence of a free radical polymerization catalyst.

The polymerizable compounds containing conjugated olefinic double bonds which are useful in the practice of this invention include hydrocarbons, such as butadiene, isoprene, 2,3-dimethyl-1,3-butadiene, 1,3-pentadiene, 2,4-hexadiene, 2,4-heptadiene, 2,5-dimethyl-2,4-hexadiene, myrcene, allo-ocimene, 2,6-dimethyl-1,3-heptadiene, 1,3-decadiene, 2 - phenyl - 1,3 - butadiene, 2,3-diphenyl - 1,3 - butadiene, 2 - benzyl-1,3-butadiene, 1,1'-biscyclohexenyl, 2 - tolyl - 1,3 - butadiene, 1-vinyl - 1-cyclohexene, 1,2-dimethylenecyclohexane, 1,3,5-hexatriene, 1,3-cyclopentadiene and 1,3-cyclohexadiene; carboxylic acids, such as 2,4-pentadienoic acid (beta-vinylacrylic acid), sorbic acid, muconic acid and eleostearic acid, and the esters of such acids; halogenated hydrocarbons such as 2-chloro-1,3-butadiene, 2-bromo-1,3-butadiene, 1-chloro-1,3-butadiene and the like; and nitriles, such as 1-cyano-1,3-butadiene (beta-vinyl-acrylonitrile) and 2-cyano-1,3-butadiene. The term "olefinic double bond" is meant to include any non-aromatic carbon-to-carbon double bond, whether occurring in an acycylic or in a cycloaliphatic system. Preferred compounds of this class are butadiene, isoprene, 2-chloro-1,3-butadiene, 2-bromo-1,3-butadiene and myrcene. Mixtures of two or more of these compounds may be employed.

The dihalophosphine to be used in this process has the formula $RPX_2$, in which R represents a member of the group consisting of alkyl, aryl and aralkyl radicals and X represents a member of the group consisting of chlorine and bromine. The preferred phosphines are dichlorophenylphosphine and dichloroethylphosphine. A wide variety of phosphine derivatives having the general formula shown may be employed. Representative compounds include those in which R represents an alkyl group such as methyl, ethyl, propyl, butyl or octyl; an aryl group such as phenyl or alpha- or beta-naphthyl; or an aralkyl group such as benzyl or phenylethyl. In general, the lower members of these classes of radicals are most useful. These compounds are readily available from several well known procedures, such as by the action of a phosphorus trihalide on a hydrocarbon in the presence of aluminum chloride, or by the action of a phosphorus trihalide on dialkyl or diaryl mercury. Kharasch in J. Org. Chem. 14, 429 (1949) describes a process for making dichloroethylphosphine from phosphorus trichloride and lead tetraethyl. The various procedures for making these compounds are summarized in Kosolapoff, Organophosphorus Compounds, Wiley, N. Y. (1950), chapter 3.

The polymerization reaction is carried out with the aid of a free radical polymerization catalyst, such as an azonitrile, or a dialkyl or diacyl peroxide. The term "free radical polymerization catalyst" is also meant to include actinic radiation, and particularly ultraviolet light. The azonitrile catalysts which may be employed in this reaction are those set forth in detail in United States Patent No. 2,471,959, to Madison Hunt and include alpha, alpha'-azodiisobutyronitrile; alpha, alpha'-azobis-(alpha-methylbutyronitrile); alpha, alpha'-azobis-(alpha-methylisocapronitrile) and the like. Suitable peroxide catalysts include the dialkyl peroxides such as di(tert-butyl) peroxides, and the diacyl peroxides such as butyryl, lauroyl and benzoyl peroxides. The amount of catalyst which may be used may vary over a wide range from 0.1% by weight upwards. From 1 to 5% by weight of catalyst, based on the total weight of the monomeric reactants, is ordinarily desirable. The azonitriles represent the preferred class of catalysts.

Although the interpolymers of this invention are most efficiently prepared by the use of polymerization catalysts of the type described, they may also be prepared without the use of catalysts. Under such conditions, lower yields and lower degrees of polymerization are obtained. In my copending application Serial No. 240,807, a process is described in which conjugated dienes are reacted with substituted dihalophosphines under condtions calculated to give monomeric addition products. As there set forth, the reactions almost always yield some polymeric products in addition to the monomers.

The two reactants may be used in equimolecular amounts or an excess of one reactant or the other may be used to serve as a reaction medium. The amount of each reactant present is preferably between 5 and 95% by weight of the total amount of reactants. If the diene is present in excess, the composition of the interpolymer will ordinarily be affected to some extent, since the excess material can take part in the polymerization. This is not true when the dihalophosphine is present in excess. Use of an excess of diene results in increased yields of polymer and in the formation of polymers of increased viscosity. The reaction may be conducted in the presence of a non-reactive medium such as petroleum ether, cyclohexane, benzene, carbon tetrachloride, chloroform and the like. The mixture should be free of substances capable of converting the dihalo compounds to the corresponding oxides, such as water, alcohols and carboxylic acids.

When chloroform is used as the reaction medium, the polymerization proceeds with unusual rapidity and results in increased yields of polymers having higher viscosities than polymers obtained with the other common solvents. These polymers are also found to contain some chlorine, even after conversion of the dichlorotertiaryphosphine groups to phosphine oxide groups. Although the nature of this effect is not entirely understood, it appears that the chloroform in some way takes part in the polymerization reaction, possibly by forming or aiding in the formation of cross-linkages and in chain transfer.

The polymers produced according to the present invention are white to light brown in color and vary in form from tacky to granular solids. By treatment with water, alcohol or a carboxylic acid, they are readily converted to polymers in which the phosphorus is present as phosphine oxide groups, as described in copending application Serial No. 240,814. The phosphine oxide polymers are heat resistant and are useful as flameproofing and anti-static agents for textiles and in the manufacture of molded articles and films.

The molecular weights of the polymers, measured by osmotic pressure after conversion of the dihalotertiaryphosphine groups to phosphine oxide groups are between 10,000 and 100,000.

The polymers produced according to the present invention contain varying amounts of phosphorus, since homopolymerization of the diene may take place at the same time and in competition with the interpolymerization. The extent to which the interpolymerization dominates is a function of the reactivities of the specific reagents under the particular reaction conditions. The phosphorus content in most cases approaches the theoretical value for polymers in which one mole of dihalophosphine has reacted with one mole of diene. This value varies with the molecular weight of the reagents and is ordinarily between 10 and 17%. After conversion of dihalotertiaryphosphine groups to phosphine oxide groups, the theoretical maximum phosphorus content may be as high as 26.7% (for the converted adduct of butadiene and dichloromethylphosphine), but is ordinarily between about 10 and 20%. Actually the interpolymer usually contains somewhat less phosphorus than the theoretical. The heat resistance and hydrophilic character of the polymers containing phosphine oxide groups increase in proportion to the amount phosphorus present. As little as 0.1% phosphorus confers these properties on the polymer to a determinable extent, while at 2% phosphorus the effect is pronounced. Interpolymers containing from about 2 to 15% phosphine (before conversion to the phosphine oxide) represent the preferred class of products made according to this invention.

The invention is illustrated by the following examples:

*Example 1*

A mixture of 50.0 g. (0.28 m.) of redistilled dichlorophenylphosphine, 19.1 g. (0.28 m.) of redistilled isoprene containing no inhibitor and 700 mg. of alpha, alpha'-azobis-(alpha-methylisocapronitrile) is warmed at about 40° C. for twenty-four hours. During this time a cream-colored solid gradually forms. A small amount of residual liquid is decanted, and the solid is washed with petroleum ether, then hydrolyized with water to give a yellow-orange oil and the mixture is neutralized with sodium hydroxide. This oil is separated from the aqueous layer, washed with water and taken up in chloroform. Evaporation of the chloroform and drying of the residue at 90° C. (10 mm.) gives 19.6 g. of a clear yellow-red vitreous resin.

*Analysis.* — Calcd. for $C_{11}H_{13}OP$: $P = 16.1\%$. Found: $P = 15.5\%$.

The product is therefore substantially the 1:1 heteropolymer, obtained in 37% conversion. By extraction of the aqueous hydrolysate layer with chloroform, followed by distillation, there is obtained an 18% yield of liquid monomeric adduct boiling at 160–165° C. (2 mm.).

*Example 2*

The procedure described in Example 1 is repeated to the point where the reaction mixture is hydrolyzed with water. The mixture is then salted and extracted with chloroform. The extract, which contains both monomeric and polymeric products, is distilled. After removal of the chloroform, a 44% yield of distilled monomer and a 47% yield of a yellow glassy hard polymeric residue are obtained.

An identical run omitting the catalyst gives a 75.5% yield of distilled monomer and 7.5% yield of polymeric residue.

*Example 3*

A mixture of 50 g. (0.28 m.) of dichlorophenylphosphine 50 ml. of cyclohexane, 19.1 g. (0.28 m.) of redistilled isoprene and 0.7 g. of the catalyst of Example 1 is warmed at 40° C. for eighteen hours. The cream-colored solid is filtered, decomposed with methanol, diluted with water and the insoluble polymer isolated from the water and dried at 100° C. for three days, to give 34.5 g. of a clear, glassy, yellow-brown resin.

*Example 4*

A mixture of 25 g. (0.14 m.) of dichlorophenylphosphine in 25 ml. of thiophene-free benzene, 9.55 g. (0.14 m.) of isoprene and 0.35 g. of the catalyst of Example 1 is warmed at 40° C. for eighteen hours. The cream-colored solid is filtered and treated with methanol. The evolution of methyl chloride indicates that conversion of dichlorotertiaryphosphine groups to phosphine oxide groups is taking place. The mixture is diluted with water and the separated polymer is dried at 100° C. for three days to give 11.6 g. of a clear, glassy, brownish resin.

Example 5

Using a 4:1 mole ratio of reagents, a mixture of 38.2 g. (0.56 m.) of isoprene, 25.0 g. (0.14 m.) of dichlorophenylphosphine in 50 ml. of cyclohexane and 0.7 g. of the catalyst of Example 1 is warmed at 40° C. for eighteen hours, during which time a somewhat stringy white solid precipitates. The mixture is filtered, hydrolyzed with water, washed and dried to give 18.4 g. of solid interpolymer containing 15.0% phosphorus (theory for the 1:1 adduct=16.1%).

Example 6

Using an 8:1 mole ratio of reagents, a mixture of 38.2 g. (0.56 m.) of isoprene, 12.5 g. (0.07 m.) of dichlorophenylphosphine and 50 ml. of cyclohexane and 0.5 g. of the catalyst of Example 1 is warmed at 40° C. for about twenty hours. The stringy white solid is isolated by filtration, decomposed with warm aqueous methanol, diluted with water, and then washed with water in a crude rubber mill, to give a cream-colored, plastic mass which is slightly rubbery. After drying, there are obtained 13.0 g. of glassy solid containing 13.6% phosphorus.

Example 7

A mixture of 46.2 g. (0.26 m.) of dichlorophenylphosphine, 18 g. (0.26 m.) of isoprene, 0.5 g. of alpha, alpha'-azobis-(alpha-methylisocapronitrile) and 100 ml. of cyclohexane is warmed at 50° C. for twenty hours. The cream-colored solid which forms is filtered, treated with methanol to convert phosphorus dihalide groups to phosphine oxide groups, and diluted with water. The resulting polymer is dried to give 22 g. of resinous product, having an intrinsic viscosity in methanol of 0.14.

This run is repeated under the same conditions except that 100 ml. of chloroform are used in place of the cyclohexane and the reaction is conducted for seventeen hours at 40° C. The product in this case weighs 47.5 g. and has an intrinsic viscosity in methanol of 0.40. It contains 4.9% chlorine (after treatment with methanol and water).

A third run is made using chloroform in place of the cyclohexane and with a polymerization time of three hours at 40° C. The polymeric product is obtained in a yield of 41.3 g. and has an intrinsic viscosity of 0.27.

Example 8

A mixture of 50.0 g. (0.28 m.) of dichlorophenylphosphine in 50 ml. of cyclohexane, 15.1 g. (0.28 m.) of butadiene and 0.50 g. of the catalyst of Example 1 is warmed at 40° C. in a sealed pressure bottle for two days. The resulting yellow brown solid is filtered, decomposed with methanol, and diluted with water to give an insoluble oil. Drying at 100° C. gives 6.1 g. of yellow solid.

Example 9

A mixture of 100.0 g. (0.56 m.) of dichlorophenylphosphine in 200 ml. of cyclohexane, 49.4 g. (0.56 m.) of 2-chlorobutadiene-1,3 and 0.50 g. of the catalyst of Example 1 is warmed at 45° C. for two days and then at room temperature for three more days. The light brown solid which forms is treated by filtration, decomposition with methanol, and dilution with water to give an insoluble oil, which on drying gives 40 g. of reddish polymer.

*Analysis.*—Per cent P=13.3; per cent Cl=14.1.

Example 10

Warming a mixture of 50.0 g. (0.28 m.) of dichlorophenylphosphine in 100 ml. of cyclohexane, 34.4 g. (0.28 m.) of 2,3-dichloro-1,3-butadiene and 1 g. of the catalyst of Example 1 at 60° C. for one day gives a tan solid product. This is worked up by filtration and digestion with hot methanol until there is no further evidence of reaction. Dilution with water and drying of the resultant solid at 100° C. gives 27.7 g. of a cream-colored solid.

*Analysis.*—Cl=52.9%; P=1.7%.

Example 11

When a mixture of 50.0 g. (0.28 m.) of dichlorophenylphosphine in 50 ml. of cyclohexane, 18.5 g. (0.28 m.) of cyclopentadiene and 0.5 g. of the catalyst of Example 1 is warmed at 35° C. for three days, a red brown solid slowly deposits. This solid is isolated by washing with petroleum ether, and is then decomposed with methanol and diluted with water to give about 1.2 g. of solid (dry weight), containing 11.8% P.

Extraction with chloroform of the aqueous layer from the decomposition and concentration gives a reddish-brown oil which on drying in vacuo at 100° C. gives 2.4 g. of a viscous oil containing 14.4% P.

Example 12

A mixture of 25.0 g. (0.10 m.) of (p-bromophenyl)-dichlorophosphine in 50 ml. of cyclohexane, 6.6 g. (0.10 m.) of isoprene and 0.75 g. of the catalyst of Example 1 is warmed at 40° C. for twenty hours. A dull white solid forms. It is treated by filtration, washing with petroleum ether, decomposition with methanol and dilution with water to give an insoluble material. This is dried at 100° C. to give 18.2 g. of a practically white solid, containing 11.0% P and 28.3% Br.

Example 13

A mixture of 40.0 g. (0.305 m.) of dichloroethylphosphine in 50 ml. of cyclohexane, 20.8 g. (0.305 m.) of isoprene and 0.70 g. of the catalyst of Example 1 is warmed at 40° C. for twenty hours. The white solid product is obtained by filtration of the reaction mixture. Hydrolysis of the solid with water gives an aqueous solution. Saturation with salt, extraction with chloroform and concentration gives 18.4 g. of a brown brittle glassy solid containing 18.0% P.

Example 14

A mixture of 25.0 g. (0.19 m.) of dichloroethylphosphine in 50 ml. of cyclohexane, 25.4 g. (0.19 m.) of 2-bromo-1,3-butadiene and 0.5 g. of the catalyst of Example 1 is warmed at 45° C. for twenty hours. A light tan solid polymer is formed. Filtration of the reaction mass and hydrolysis with water gives a heavy yellow oil which is separated from the aqueous layer and dried to give 21 g. of a yellow-brown resin containing 12.3% P and 48.0% Br.

Example 15

A mixture of 50.0 g. (0.28 m.) of dichlorophenylphosphine and 50 ml. of cyclohexane, 19.1 g. (0.28 m.) of isoprene, 14.8 g. (0.28 m.) of acrylonitrile and 0.50 g. of the catalyst of Example 1 is warmed at 40° C. for twenty hours. Filtration of the cream-colored solid polymer, conversion of the dichlorotertiaryphosphine to the corresponding phosphine oxide with methanol and dilution with water gives an oil. This is separated, washed with water and dried to give 20.0 g. of a transparent brownish glass, containing 15.0% P and 0.9% N.

*Example 16*

The process described in Example 3 is repeated, using ultraviolet light as catalyst instead of the azonitrile catalyst. This gives 10.7 g. of polymeric dichlorophosphine. After conversion to the corresponding phosphine oxide the polymer contains 15.9% P.

When 500 mg. of dibenzoyl peroxide are used as catalyst in place of the azonitrile or ultraviolet light, there are produced 2.0 g. of a polymeric phosphine oxide containing 14.9% P.

In the absence of any polymerization catalyst, methanol-soluble interpolymers are obtainable by the reaction between dichlorophenylphosphine and 1-cyano-1,3-butadiene, ethyl sorbate, 1-(p-nitrophenyl)-1,3-butadiene, 2-methoxy-1,3-butadiene, and 1-acetoxy-1,3-butadiene; and by the reaction between dichloronaphthylphosphine and isoprene.

The interpolymerization may be carried out at any temperature short of the decomposition point of the chemicals involved. The lower temperature limit is that at which the reaction becomes impractically slow. Temperatures from −10° to 125° C. may be used, the preferred range ordinarily being from room temperature to about 75° C. Within this range, no "ceiling effect" has been observed, i. e., there appears to be no temperature at which the rate of depolymerization balances or exceeds the rate of polymerization. The reaction will usually be carried out at atmospheric pressure, although higher or lower pressures may be used.

I claim:

1. The process of preparing a phosphorus-containing polymeric addition product which comprises contacting a polymerizable organic compound containing conjugated olefinic double bonds with a mono-substituted dihalophosphine having the formula $RPX_2$ in which R represents a member of the group consisting of alkyl, aryl and aralkyl radicals and X represents a member of the group consisting of chlorine and bromine, in the presence of a free radical polymerization catalyst and in the absence of substantial amounts of hydroxyl-containing compounds.

2. The process of preparing a phosphorus-containing polymeric addition product which comprises contacting a polymerizable organic compound containing conjugated olefinic double bonds with a mono-substituted dihalophosphine having the formula $RPX_2$ in which R represents a member of the group consisting of alkyl, aryl and aralkyl radicals and X represents a member of the group consisting of chlorine and bromine, in the presence of chloroform and a free radical polymerization catalyst and in the absence of substantial amounts of hydroxyl-containing compounds.

3. A process according to claim 1 in which the polymerizable organic compound is selected from the group consisting of butadiene, isoprene, 2-chloro-1,3-butadiene and 2-bromo-1,3-butadiene.

4. A process according to claim 1 in which the polymerizable organic compound is butadiene.

5. A process according to claim 1 in which the polymerizable organic compound is isoprene.

6. A process according to claim 1 in which the polymerizable organic compound is 2-chloro-1,3-butadiene.

7. The process of preparing a phosphorus-containing polymeric addition product which comprises contacting butadiene with dichlorophenylphosphine in the presence of a free radical polymerization catalyst comprising an azonitrile and in the absence of substantial amounts of hydroxyl-containing compounds.

8. The process of preparing a phosphorus-containing polymeric addition product which comprises contacting isoprene with dichlorophenylphosphine in the presence of a free radical polymerization catalyst comprising an azonitrile and in the absence of substantial amounts of hydroxyl-containing compounds.

9. The process of preparing a phosphorus-containing polymeric addition product which comprises contacting 2-chloro-1,3-butadiene with dichlorophenylphosphine in the presence of a free radical polymerization catalyst comprising an azonitrile and in the absence of substantial amounts of hydroxyl-containing compounds.

10. A polymeric addition product of a polymerizable organic compound containing conjugated olefinic double bonds and a mono-substituted dihalophosphine having the formula $RPX_2$ in which R represents a member of the group consisting of alkyl, aryl and aralkyl radicals and X represents a member of the group consisting of chlorine and bromine, said addition product containing at least 0.1% chemically bound phosphorus.

11. The polymeric addition product of claim 10 in which the polymerizable organic compound is selected from the group consisting of butadiene, isoprene, 2-chloro-1,3-butadiene and 2-bromo-1,3-butadiene.

12. A polymeric addition product of butadiene and dichlorophenylphosphine, said addition product containing at least 0.1% chemically bound phosphorus.

13. A polymeric addition product of isoprene and dichlorophenylphosphine, said addition product containing at least 0.1% chemically bound phosphorus.

14. A polymeric addition product of 2-chloro-1,3-butadiene and dichlorophenylphosphine, said addition product containing at least 0.1% chemically bound phosphorus.

WILLIAM B. McCORMACK.

References Cited in the file of this patent

UNITED STATES PATENTS

| Number | Name | Date |
|---|---|---|
| 2,382,812 | Parker | Aug. 14, 1945 |
| 2,520,601 | Lee | Aug. 29, 1950 |